June 3, 1969  R. C. NELSON ET AL  3,447,561
ADDITIVE INJECTION VALVE WITH DETACHABLE INLET NOZZLE
Filed Dec. 27, 1965

INVENTORS
RONALD C. NELSON
RICHARD R. COOK
BY
*George P. Chandler*
ATTORNEY

United States Patent Office 3,447,561
Patented June 3, 1969

3,447,561
ADDITIVE INJECTION VALVE WITH
DETACHABLE INLET NOZZLE
Ronald C. Nelson, Bridgeton, and Richard R. Cook, Creve
Coeur, Mo., assignors to Monsanto Company, St. Louis,
Mo., a corporation of Delaware
Filed Dec. 27, 1965, Ser. No. 516,451
Int. Cl. F16c 51/00; F16l 29/00, 35/00
U.S. Cl. 137—240                    2 Claims

ABSTRACT OF THE DISCLOSURE

A novel additive valve which eliminates interruption of process flow accompanying cessation of additive injection. Stagnant additive is readily removed from that portion of the valve body susceptible to clogging; cleaning is easily accomplished without disruption of the primary flow passageway.

---

Figure 1:
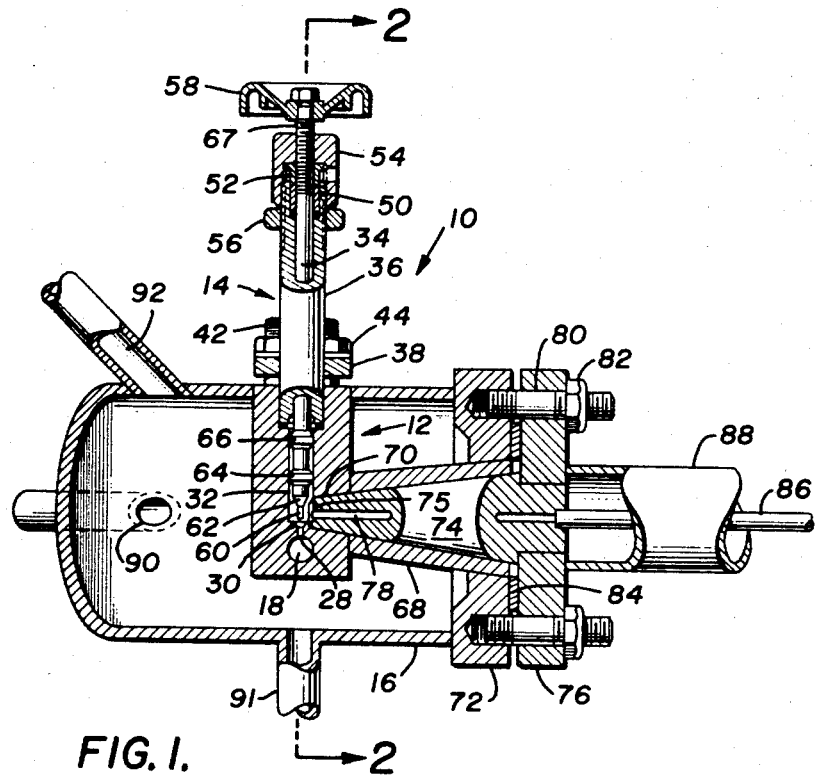

This invention relates to a valve for supplying an additive to a flow of fluid, and more particularly relates to a valve for supplying an additive to a heated, flowable polymer in which the greater portion of the additive passageway is removable.

In the manufacture of synthetic fibers the polymer from which they are produced must be maintained in a heated condition to achieve flowability during the manufacturing stages upstream from the spinning head. This is especially true of polyamide fibers such as nylon which are produced by a process known as melt spinning. In order to produce desired fiber characteristics it is usually necessary to inject additives to the heated flowing liquid. These additives may consist of pigments to produce color or other compounds which have a delustering effect in the finished fiber.

To prevent freeze-up of the heated polymer, the additives injected must also be at an elevated temperature. Unfortunately, many of these additives, such as titanium dioxide for delustering, tend to cake up and clog supply lines when heated. Caking up is especially pronounced when the flow of the additive ceases as in instances in which injection into the polymer flow becomes unnecessary or undesirable.

Heretofore, the injection of additives has been accomplished by welding an additive inlet through and into the polymer flow line. To control the flow of additive a valve is located in the inlet upstream of the injection point. Thus, when additive injection ceases, caking up occurs from the valve to the injection point necessitating disruption of the entire process flow while the additive inlet is removed from the polymer line and cleaned or replaced. Since the additive inlet is not readily removable, disruption of the process flow continues over a considerable period of time resulting in a substantial loss of production and, hence, losses in salable fibers.

According to the instant invention, this difficulty has been overcome by utilizing a stem valve that effectively stops the additive flow at the injection point thereby minimizing the length of additive supply tubing subject to caking. The portion of the additive supply inlet upstream of the injection point is readily removable so that any caking or clogging which does occur is minimized and easily cleaned away without disrupting the primary polymer flow.

Structurally the above result is accomplished by a valve body including a valve opening and a valve seat at least a portion of which is substantially flush with the surface of a polymer passageway extending through the body. A valve stem disposed in the body is formed to be positioned across the valve opening and on the seat to block additive flow. An aperture extends through a wall of the valve body and removably and sealingly receives an additive inlet tube the innermost end of which is the valve opening. When additive flow is stopped, therefore, stagnant additive will remain only in that portion of the valve body which is removable and readily accessible for cleaning.

Accordingly, it is an object of this invention to provide a valve for adding a desired ingredient to a primary flow stream.

Another object of this invention is to provide an additive valve in which the additive inlet tube is readily removable for easy cleaning.

Still another object of this invention is to provide an additive valve in which the length of additive inlet tube susceptible to caking up is minimized.

A still further object of this invention is to provide an additive valve in which that portion of the additive inlet not removable for cleaning is held to a minimum.

Figure 2:
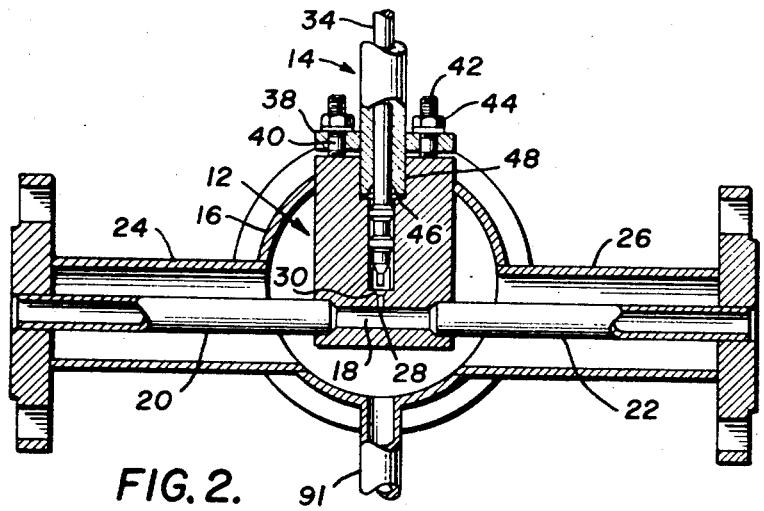

These and other objects and advantages of this invention will be more apparent upon reference to the following specification, appended claims, and drawing wherein:

FIGURE 1 is a partly sectional view of an additive valve according to the instant invention showing the relationship between the primary stream passageway, the valve stem, and the removable additive inlet; and FIGURE 2 is a partly sectional view taken along line 2—2 of FIGURE 1.

In order to better understand the construction and use of this novel additive valve, it will be described in relation to the injection of desired substances into a stream of fluid polymer which is to be spun into synthetic fibers. It is to be understood, however, that various other uses may be found for this novel additive valve. For example, such a valve could be utilized to inject additives into streams of paint, molten metals, liquid foods, and virtually any fluid substance. Other uses will be readily apparent to those skilled in the art.

With continued reference to the accompanying figures wherein like numerals designate similar parts throughout the various views and with initial attention directed to FIGURE 1, reference numeral 10 designates generally the additive valve according to the instant invention including a body portion 12, a stem portion 14, and a jacket 16 for containing a heating fluid. The body portion 12 includes a primary flow stream passageway 18 which, as shown in FIGURE 2, extends through the valve body 12 and is connected to supply conduits 20 and 22 surrounded by fluid tight heating jackets 24 and 26 respectively.

Extending at substantially right angles to the primary flow passageway 18 is a shaped aperture having a cylindrical portion 28 adjacent the passageway 18 and a conically shaped seat 30. Also, extending into the valve body 12 at substantially right angles to the passageway 18, is a stem tube 32 into which the conical valve seat 30 opens. A valve stem 34 is movably disposed in the stem tube 32 and within a stem housing 36 extending above the body of the valve 12. As shown in FIGURE 2 the stem housing 36 is secured to the valve body 12 by a flange 38, welded or otherwise suitably secured thereto, having apertures 40 through which studs 42 mounted in the body 12 extend. Nuts 44 or other suitable fastening devices are provided to cooperate with the studs 42 to sealingly press the stem housing 36 against a gasket 46 disposed within an enlarged portion 48 of the stem tube.

Packing 50 is provided within the upper portion of the stem housing 36 and is forced and maintained in sealing engagement with the stem 34 by a gland 52 and a packing nut 54. Unwanted rotation of the packing nut 54 is prevented by jam nut 56 threaded onto the stem housing 36. A handle 58 is provided at the upper terminal end of the stem 34 for convenience in rotation thereof.

The lower terminal end section of the stem 34 is provided with a cylindrical portion 60 conformed to extend into and occupy the cylindrical portion 28 of the shaped aperture. Likewise, a conical portion 62 is provided on the lower end of the stem 34 to sealingly isolate the passageway 18 from the stem tube 32 when positioned on the valve seat 30. A lower protuberance 64 and an upper protuberance 66 extend around the lower section of the valve stem 34 for a purpose to be hereinafter described. The operation of a valve stem is well known and requires no further explanation except to state that as the handle 58 is rotated in one direction, the stem will move downwardly because of threaded portion 67 into a position in which the cylindrical portion 60 of the stem occupies the cylindrical portion 28 of the shaped aperture and the conical portion 62 of the stem is sealingly positioned on the valve seat 30. When handle 58 is rotated in the opposite direction these elements are moved to the position shown and communication is again established between the stem tube 32 and the passageway 18 through the cylindrical and conical portions 28 and 30 respectively of the shaped aperture.

A socket 68 is formed on and extends outwardly from the body portion 12 and is defined partly by a recess 70 extending through the valve body and terminating in the stem tube 32 as close to the valve seat 30 as possible. The socket 68, including recess 70, is conical in shape and terminates at its outermost end in a flange 72 welded, or otherwise suitably secured thereto. Obviously, the socket 68 can be formed as an integral part of the valve body 12 or, as shown, welded or secured thereto in any well known manner.

An additive inlet tube 74 is tapered and notched at 75 to complement the shape of the socket 68, and, as shown in FIGURE 1 the stem tube 32. The tube 74 terminates in a flange 76 welded or secured thereto in any suitable manner similarly to the socket 68. Thus, the additive inlet tube 74 may be inserted into the socket 68 with the additive passageway 78 opening into and flush with the wall of the stem tube 32. The tube 74 is held in this position by a stud 80 threaded into socket flange 72 and clamped on the flange 76 by nuts 82. Leakage from the socket 68 inlet tube 74 assembly is prevented by a gasket 84. The additive passageway 78 is connected through a small conduit 86 to a heat exchanger (not shown) where its temperature is elevated as desired, and thence to an additive supply, also not shown. A jacket 88 surrounds the tube 86 to maintain the temperature of the additive at the desired level as its travel from the heat exchanger to the additive inlet tube 74.

While a preferred recess 70 and inlet tube 74 configuration is illustrated, others can be utilized successfully. For example, the recess could terminate short of the surface of stem tube 32 and communicate therewith through a short passageway. Such would result in a simplified construction but would increase the area subject to caking. This area would, however, be readily accessible for cleaning.

The entire valve body assembly 12 is surrounded by a fluid tight jacket 16 as hereinbefore described. A heating fluid such as Dowtherm is circulated through the jacket, entering through aperture 90 and exiting through aperture 91. Typical operating conditions within the jacket 16 would be 95 p.s.i.g. and 700° F. As shown most clearly in FIGURE 1 the jacket 16 is welded to the flange 72 to completely isolate the valve body 12 from the surrounding environment with the exception of access provided to the interior of stem tube 32 through the socket 68. Vent 92 provides an outlet for purging light noncondensable gases which accumulate within jacket 16.

While the polymer conduits and valve body are shown to be surrounded by a heat jacket, it is apparent that other devices could be employed for this purpose. For example, electrical resistance heating tapes could be applied to the conduits and valve or, if desired, the entire assembly could be placed in a heated cozy. Furthermore, the novel valve which is the subject of this application could as well be utilized where no external heat supply is required, or in other words without a jacket.

In a typical operating situation a polymer is flowing through the primary stream of passageway 18 and the valve stem 34 is in the open position, as illustrated, in order that an additive may flow through the passageway 78 into stem tube 32 and through the shaped aperture including the conical seat 30 and the cylindrical portion 28. In such a situation additive caking is minimized since it is flowing. When the valve stem 34 is moved so that stem conical portion 62 is sealingly positioned on the valve seat 30, and the stem cylindrical portion 60 occupies the cylindrical opening 28, the additive passageway 78 is sealingly isolated from the primary stream passageway 18 while lower and upper protuberances 64 and 66 effectively restrict the flow of additive upwardly along the stem 34. Position sealing is provided at packing 50. By filling the shaped aperture including the conical portion 30 and the cylindrical portion 28 the stem precludes the clogging of this area by caked additive.

After valve stem 34 is moved into the closed position, stagnant additive remains in passageway 78 and conduit 86. Caking in this area is no problem, however, since by removal of nuts 82 from studs 80 additive inlet tube 74 can be removed from socket 68 and cleaned at leisure. If prolonged interruption of additive flow is undesirable, a spare inlet tube 74 could be inserted while the caked tube is cleaned. Removal of this tube 74 also provides access to the stem tube 32 in order that any additive which collects in the clearance between the tube walls and stem 34 may be removed. Obviously, as the inlet tube 74 is removed, conduit 86 and jacket 88 must be disconnected from the supply line, usually at the heat exchanger, in a known manner.

It will be apparent from the foregoing description that an additive valve which eliminates the extensive interruption of process flow usually accompanying the cessation of additive injection has been devised. It is now possible to maintain the primary flow stream while the additive inlet tube is removed for cleaning, repair, or replacement. Two or more of these additive valves may be placed along the primary flow stream conduit so that additive injection can be accomplished through one or more inlets while others are removed. Thus, now instead of substantially disassembling the whole process flow line when additive injection is ceased or changed, only a simple operation of removing a number of nuts and an inlet tube from a socket is required in such a situation. The resulting saving in time, labor, and hence expense is of great consequence.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A valve for injecting an additive to a polymer flow stream which can be cleaned without disruption of said stream upon clogging of additive proximate the point of injection comprising:
    a valve body provided with a passageway for the polymer flow stream, a stem tube angularly related to said passageway, a tapered socket situated terminally of the stem tube and communicating therewith, an aperture communicating the passageway with the stem tube, said aperture being cylindrical adjacent the passageway and a truncated cone adjacent the stem tube thereby defining a valve seat within said valve body;

a valve stem disposed in said stem tube including a terminal cylindrical end portion and an adjacent conical section complementing the valve seat and adapted to be sealingly positioned thereon; and an additive inlet tube complementary to the tapered socket the terminal portion of said inlet seated sealingly with respect to the socket, the innermost portion of which terminates substantially flush and communicates with the end of the stem tube proximate the aperture whereby the additive inlet can be readily removed from its tapered socket for the purpose of cleaning clogged additive without disruption of the polymer flow stream.

2. A valve for injecting additive as recited in claim 1 to a heated flowable polymer wherein means are provided for heating said valve body.

References Cited

UNITED STATES PATENTS

| | | | |
|---|---|---|---|
| 404,392 | 6/1889 | Egner et al. | 137—375 XR |
| 1,797,591 | 3/1931 | Sartakoff | 251—367 XR |
| 2,012,427 | 8/1935 | Haun | 251—366 XR |
| 2,023,915 | 12/1935 | Connell | 137—340 |
| 2,792,845 | 5/1957 | Atherton et al. | 137—375 |
| 2,820,604 | 1/1958 | Ray | 251—367 XR |
| 3,101,094 | 8/1963 | McKenzie | 137—340 |
| 3,117,587 | 1/1964 | Willinger | 251—367 XR |
| 3,224,684 | 12/1965 | Roosa | 137—315 XR |
| 3,348,571 | 10/1967 | Holton | 137—340 |

HENRY T. KLINKSIEK, *Primary Examiner.*

U.S. Cl. X.R.

18—8, 13; 251—151; 285—332